United States Patent
Bushnell et al.

(10) Patent No.: US 6,763,669 B1
(45) Date of Patent: Jul. 20, 2004

(54) MODULAR AIR CONDITIONER FOR A BUS ROOFTOP

(75) Inventors: Peter R. Bushnell, Cazenovia, NY (US); Mark Colton, Clay, NY (US); Robert C. Reimann, LaFayette, NY (US); Stephen Stopyra, Syracuse, NY (US); Christopher Repice, Camillus, NY (US); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/429,437

(22) Filed: May 5, 2003

(51) Int. Cl.[7] ................................................. B60H 1/32
(52) U.S. Cl. ........................ 62/115; 62/244; 62/DIG. 16
(58) Field of Search ........................... 62/239, 244, 298, 62/DIG. 16, 428, 429

(56) References Cited

U.S. PATENT DOCUMENTS

| | | | | |
|---|---|---|---|---|
| 4,683,942 A | * | 8/1987 | Bierkamp et al. | 166/53 |
| 4,905,478 A | * | 3/1990 | Matsuda et al. | 62/244 |
| 5,211,027 A | * | 5/1993 | Lofting et al. | 62/244 |
| 6,128,911 A | * | 10/2000 | Mathews et al. | 62/256 |
| 6,295,826 B1 | * | 10/2001 | Lee | 62/244 |
| 6,508,076 B1 | * | 1/2003 | Gast et al. | 62/408 |

* cited by examiner

Primary Examiner—William E. Tapolcai
(74) Attorney, Agent, or Firm—Wall Marjama & Bilinski LLP (57) ABSTRACT

A module is provided for attachment to the roof of a bus and includes all of necessary components for conditioning the return air from the passenger compartment and delivering conditioned air thereto. A module can be ganged in various relationships to collectively provide the total capacity required by the bus. Each module includes an evaporator section, a condenser section and a power section including a compressor and an inverter. The evaporator sections have a return air compartment that extends a substantial distance across the roof of the bus such that a single design can meet the needs of various return air duct installations of various types of buses. Provision is made for the selectively mixing of return air with fresh air, with the mixture then being passed by the evaporator blower through the evaporator coils and into the supply air ducts. The frames of the modules are attached to the roof of the bus by rails which are properly spaced to accommodate the modules frame and allow their selective longitudinal placement.

9 Claims, 11 Drawing Sheets

MODULAR AIR CONDITIONER FOR A BUS ROOFTOP

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system for the rooftop of a bus.

The most common approach for air conditioning a bus is to locate the air conditioning components on the rooftop thereof. Inasmuch as power is available from the engine that drives the bus, it has become common practice to locate the air conditioning compressor near the drive engine such that the drive engine is drivingly connected to the compressor, with the compressor then being fluidly interconnected to the air conditioning system on a rooftop of a bus. This, of course, requires rather extensive piping between the engine compartment and the air conditioning unit, thereby increasing installation and maintenance costs.

Another problem with such existing systems is that the speed that the compressor is driven is dependent on the speed in which the drive engine is running. Thus, when the drive engine is idling in a parking lot, for example, the compressor is running at a relatively slow speed which may not be sufficient to provide the desired degree of air conditioning. It is therefore generally necessary to oversize the compressor in order to obtain the performance needed under these conditions.

Others problems associated with such a motor driven compressor system is that the open drive compressor needs a shaft seal and a mechanical clutch, both of which are subject to maintenance problems. Further, since DC power is available on a bus, DC motors have been used for the air conditioning system. In general, DC motors are not as reliable as AC motors since they have brushes that wear out, and brushless motors are relatively expensive.

In addition to the problems discussed hereinabove, it is recognized, that because the wide variety of bus types and application requirements, it has been necessary to provide many different types and variations of air conditioning systems in order to meet these different requirements and vehicle interfaces. As a result, the manufacturing and installation costs, and sustaining engineering resources that are necessary in order to properly maintain and service these units, are relatively high.

Also associated with the existing bus air conditioning systems is the problem of a component failure causing a complete loss of the air conditioning capacity. That is, with a single large unit as is now customary, failure of that unit such as, for example, a leaking hose causing loss of refrigerant, an electrical failure leading to inoperation of one of the components such as a fan, or a compressor failure, the entire unit is inoperable and no air conditioning can be provided to the unit. In such a situation, it would preferable if partial capacity could be maintained in order to provide a "limp home" capability.

It is therefore an object of the present invention to provide an improved bus top air conditioning system.

Another object of the present invention is the provision for a bus air conditioning system which is effective at all operating engine speeds of the bus, while at the same time does not require an oversized compressor.

Yet another object of the present invention is the provision for reducing the manufacturing, installation, and maintenance costs of a bus air conditioning system.

Another object of the present invention is that of providing a "limp home" capability in the event of certain component failures.

Yet another object of the present invention is the provision for a bus rooftop air conditioning system which is economical to manufacture and effective in use.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air and supply air ducts on a bus.

In accordance with another aspect of the invention, rather than a large single air conditioning unit, a plurality of relatively small identical modules can be installed on the roof of a bus, with each being capable of operating independently of the others so as to allow for the relatively low cost mass production of identical standardized units and also provide for a limp home capability in the event of failure of one or more units.

In accordance with another aspect of the invention, each of a plurality of modules are installed in a centered relationship with respect to a longitudinal centerline of the bus and extend transversely across the width of the bus. The number and length of modules is dependent on the total air conditioning capacity requirement of the bus.

By yet another aspect of the invention, each of the identical modules includes all the necessary components with electrical power being provided to the electrical components by an inverter/controller that is powered by an engine driven generator.

By another aspect of the invention provision is made for mounting the frames of multiple modules in adjacent or longitudinally spaced positions on the bus rooftop by way of a pair of longitudinally extending rails.

By still another aspect of the invention the evaporator section of the modules has a return air compartment that spans a substantial width of the bus to thereby accommodate various sizes and types of return air interface requirements.

By yet another aspect of the invention the evaporator section of each module has three different vertical levels to accommodate the respective incoming flows of return air and replenishing fresh air, and includes a mixer for selectively varying the amount of each which passes to the fan and then to the evaporator coil.

In the drawings as hereinafter described, a preferred embodiment is depicted; however various other modifications and alternate constructions can be made thereto without departing from the true spirit and scope of the invention.

DESCRIPTION OF THE PREFERRED EMBODIMENTS

Figure 1:
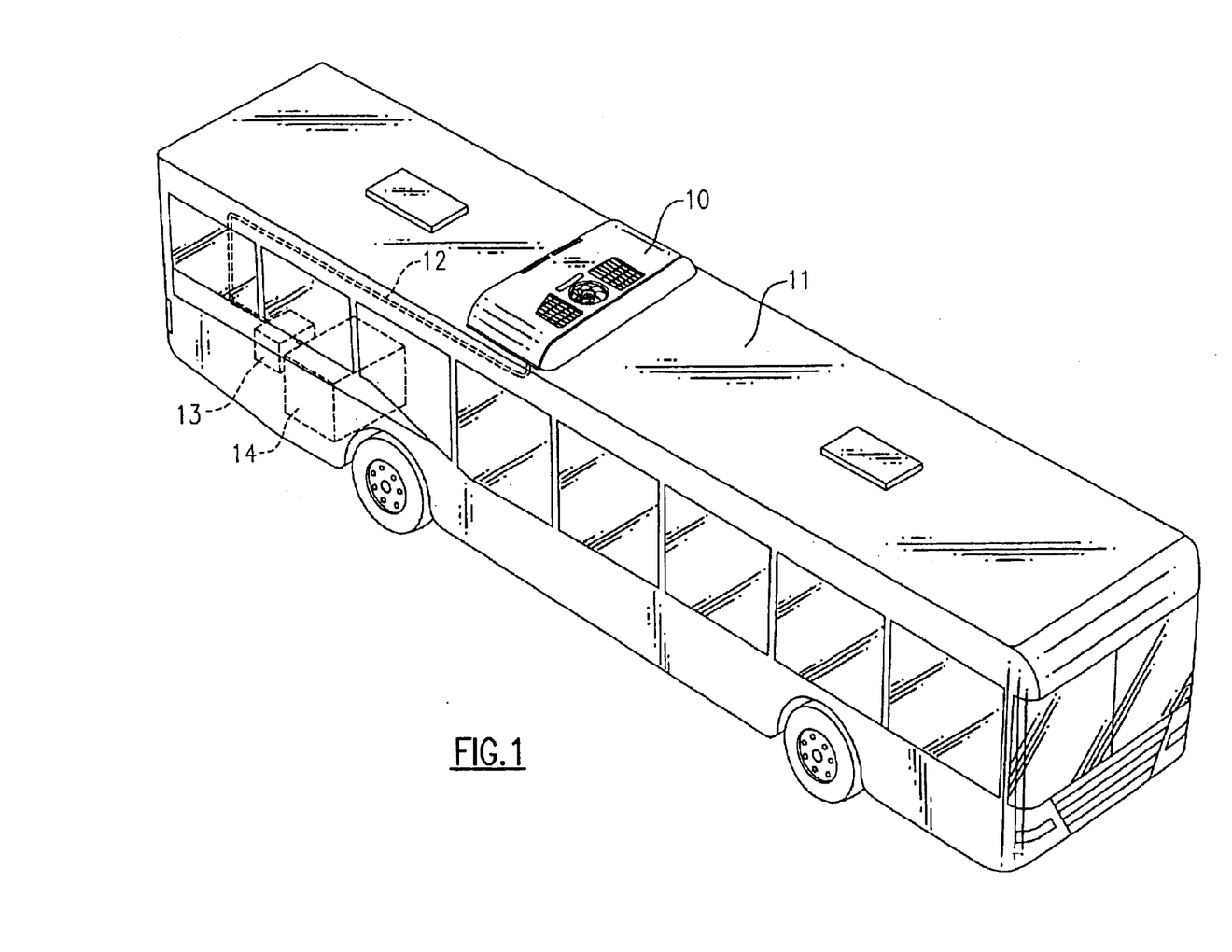
FIG. 1 is a perspective view of a module as installed on the rooftop of a bus in accordance with a preferred embodiment of the invention.

The inventive module is shown generally at 10 in FIG. 1 as applied to the rooftop top 11 of a bus in accordance with the present invention. Electrical power is provided to the module 10 by way of line 12, which in turn receives its power from a generator 13 driven by the bus engine 14 as shown.

The module 10 interfaces with openings in the bus top so that fans within the module 10 cause the return air from the passenger compartment to flow upward into the module 10 where it is conditioned, and the conditioned air to then flow downwardly into supply air ducts that carry the conditioned air to the passenger compartment. The various structures and the manner in which they interface with the bus rooftop 11 will more fully described hereinafter.

Figure 2:
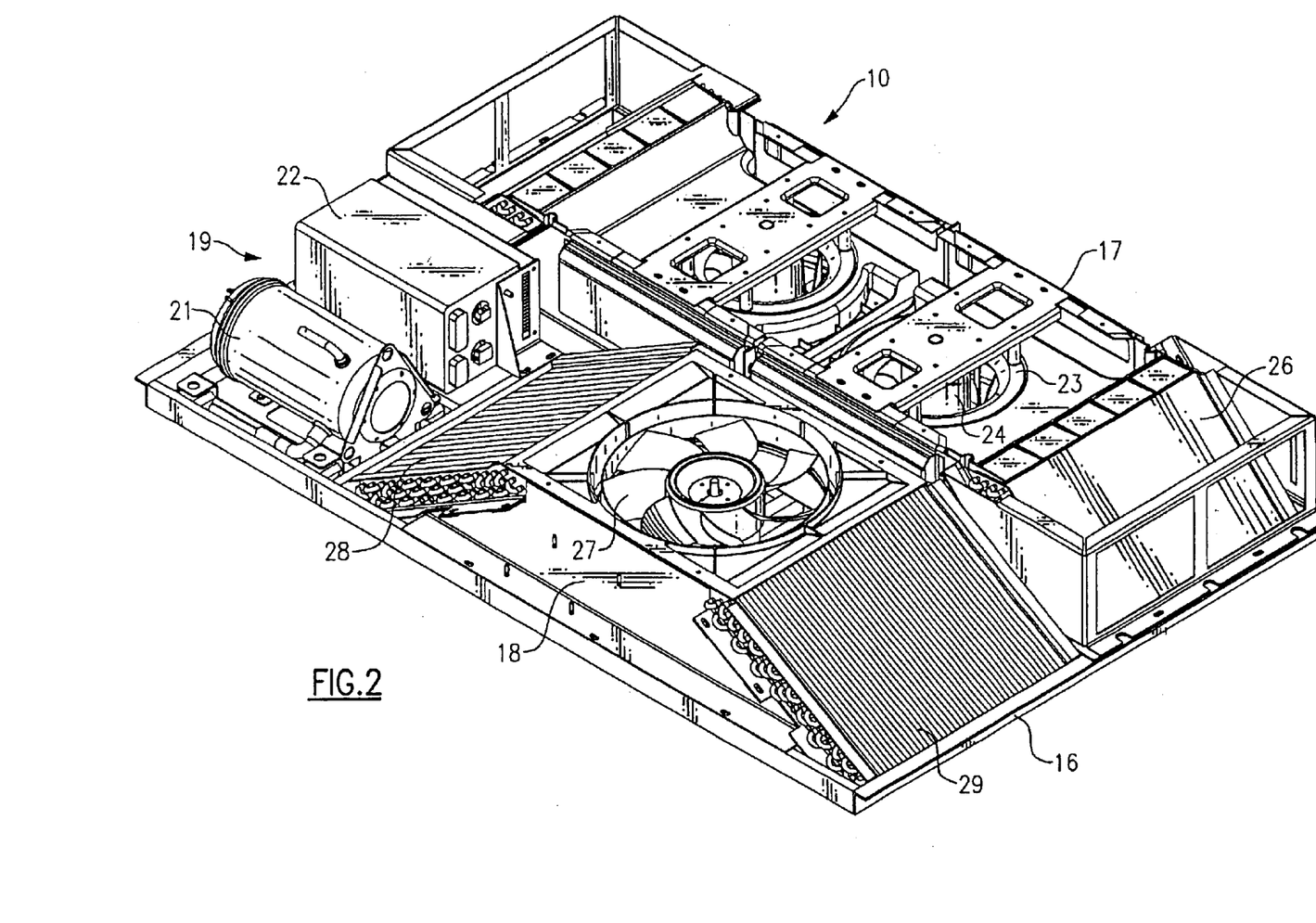
FIG. 2 is a perspective view of a module with the top cover removed.

In FIG. 2, the module 10 is shown with its cover removed to include a frame 16 with an evaporator section 17 attached to one end thereof and a condenser section 18 attached to the other end thereof. Adjacent the condenser section 18 is a power section 19 which includes a compressor 21 and an inverter/controller 22. The manner in which they provided motive power to the refrigerant circuit and electrical power to the electrical components of the module 10 will be more fully described hereinafter.

The evaporator section 17 comprises a pair of identical units in abutting end-to-end relationship with each unit including an evaporator blower 23 with its evaporator blower motor 24, and an evaporator coil 26. Briefly, the evaporator blower 23 draws in return air from the passenger compartment of the bus, and fresh air from outside and passes a mixture of the two through the evaporator coil 26 to be conditioned, after which it flows back to the passenger compartment by way of the supply air ducts. This will be more fully described hereinafter.

Within the condenser section 18, there is provided a condenser fan 27 driven by an electric motor, and a pair of condenser coils 28 and 29. Briefly, the condenser fan draws air upwardly to create a vacuum below, which in turn causes fresh air to be drawn through the condenser coils 28 and 29 to condense the refrigerant flowing through the coils 28 and 29. The resulting warm air is then discharged upwardly to the atmosphere by the fan 27.

Figure 3:
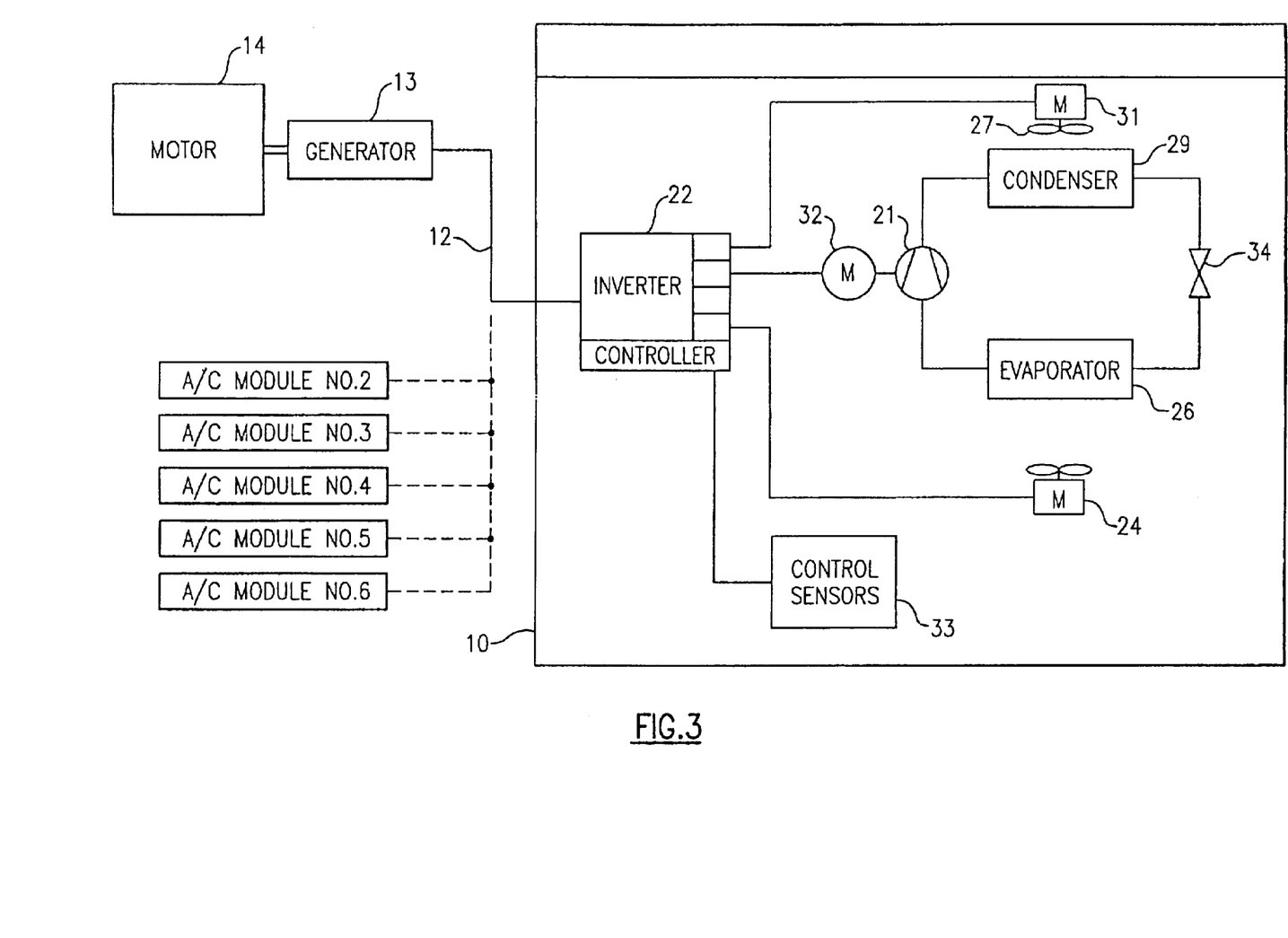
FIG. 3 is a schematic illustration of the electrical and refrigerant circuits within the module in accordance with the preferred embodiment of the invention.

Referring now to FIG. 3, the module 10 is shown with its electrical connection by way of line 12 to the generator 13 and driving vehicle engine 14. The inverter/controller 22 receives AC power from the generator, or alternator, and, in turn provides discretely controlled AC power to the evaporator blower motor 24, the drive motor 31 of the condenser fan 27 and the drive motor 32 of the compressor 21. A plurality of control sensors, shown generally at 33 provide feedback to the inverter/controller 22 as necessary for it to control the AC power being delivered to the various drive motors.

As will be seen, the refrigeration circuit is a closed circuit through which the refrigerant flows from the compressor 21 to the condenser 29, an expansion valve 34, the evaporator 26 and finally back to the compressor 21. This is accomplished in a conventional manner.

It will be seen that the module 10 is self-contained with all of the necessary components, with the only input thereto being the electrical power by way of the electrical line 12. Other modules, indicated as numbers 2–6 are identically configured and are powered and controlled in the same manner.

Figure 4:
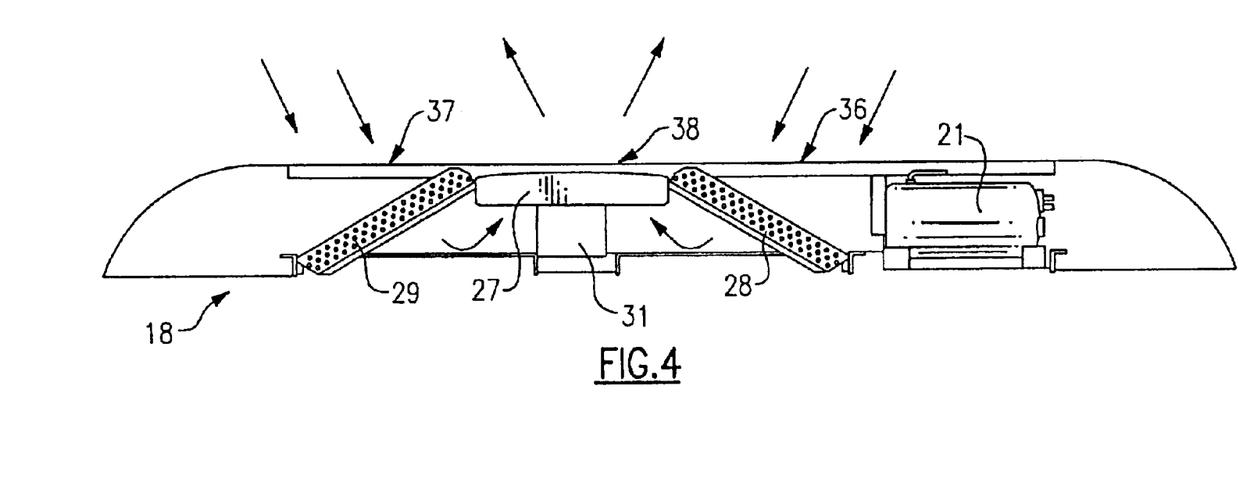
FIG. 4 is a front elevational view of the condenser section of the module.

Returning now to the condenser section 18 as shown in FIG. 4, the flow of air as caused by the condenser fan 27 is shown by the arrows. Fresh air is drawn in through the fresh air intake openings 36 and 37, passes through the respective condenser coils 28 and 29 and then flows upwardly through the condenser fan 27 and the condenser outlet air opening 38 as shown.

Figure 5:
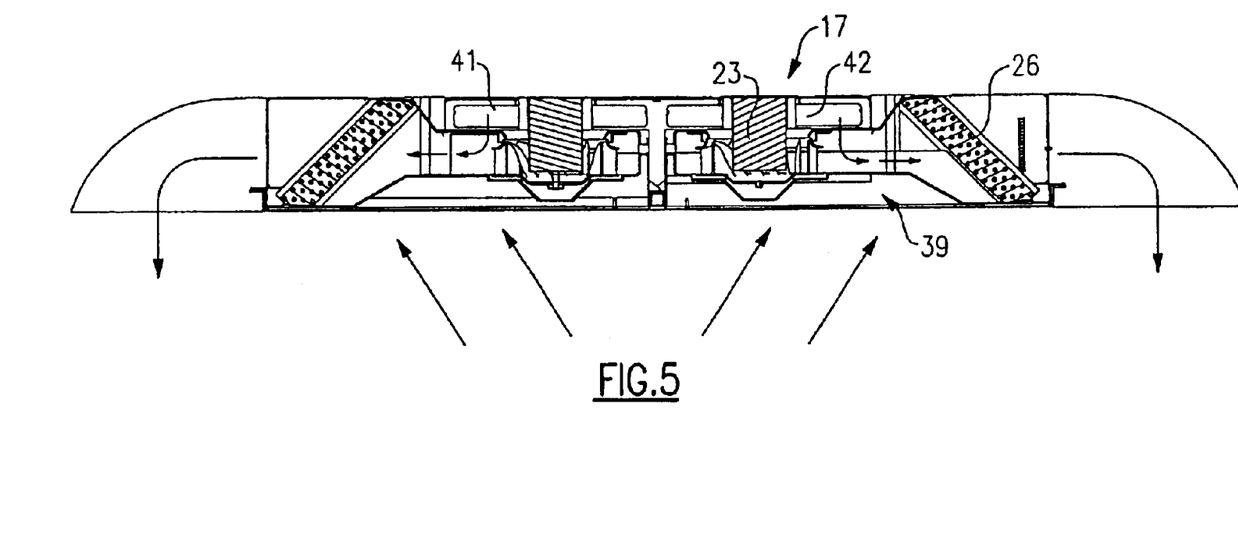
FIG. 5 is a front elevational view of the evaporator section of the module.
Figure 6:
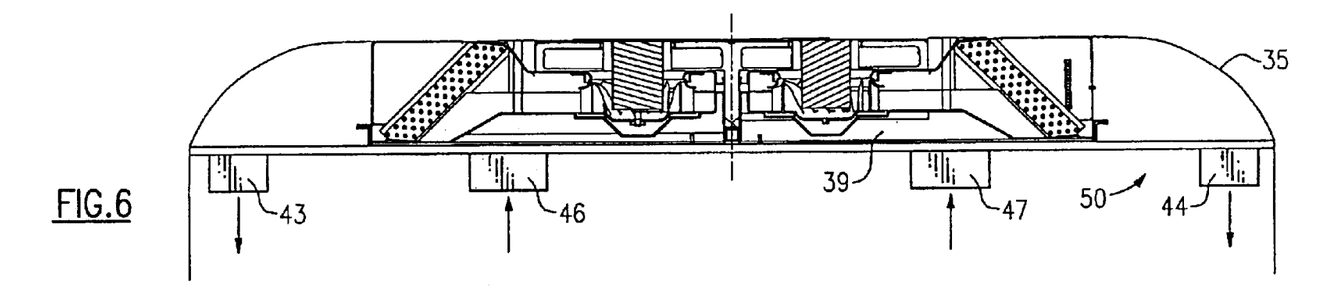
FIGS. 6–8 are front elevational views of the evaporator section as applied to different types of bus rooftops.
Figure 7:
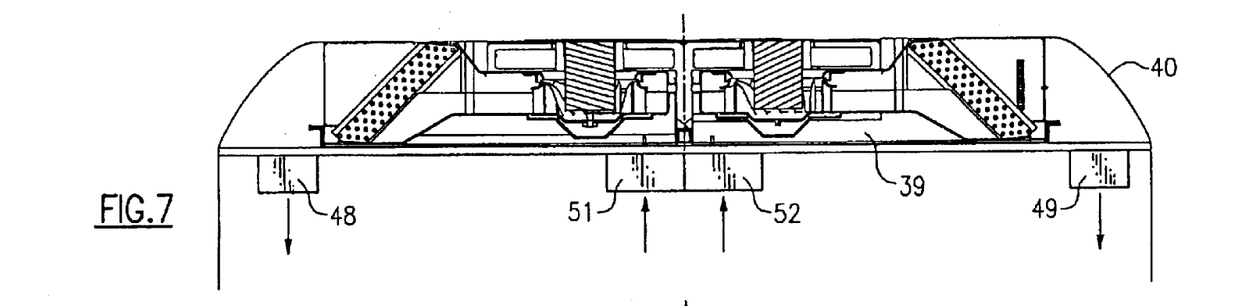
Figure 8:
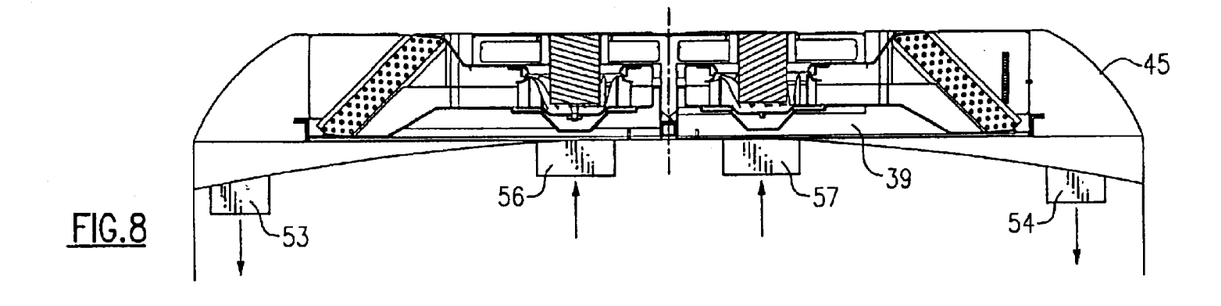

Within the evaporator section 17 as shown in FIG. 5, the relatively warm return air flows upwardly from a return air duct communicating with the passenger compartment and enters a return air compartment 39 of the evaporator section 17 as shown by the arrows. The evaporator blower 23 causes the return air to flow upwardly to its inlet at the top, and at the same time, fresh air may be brought in by way of a fresh air flap in a manner to be described hereinafter. A mixture of the two airflow streams is thus admitted at the intake of the evaporator blower 23 and caused to flow downwardly and outwardly as indicated by the arrows to the evaporator coils 26. After passing through the evaporator coil 26 it is then caused by a curved cowling 41 to flow downwardly to a supply air duct leading to the passenger compartment. Thus, while the module is operating, there is a constant circuitous flow of return air out of the passenger compartment and of conditioned air back into the passenger compartment. The amount of return air that is discharged to the outside, and also the amount of fresh air that is brought into the circuit from the outside is controlled by the selective movement of the fresh air flaps as will be described hereinafter. There are shown in FIGS. 6–8 installations of the module 10 with various types of buses and associated return air and supply air ducts. In FIG. 6, for example, a wide bus installation is shown wherein the existing duct work within the bus includes supply air ducts 43 and 44 near the lateral sides of the bus, and return air ducts 46 and 47 that are closer to the center line of the bus, but are substantially spaced apart. Here it will be seen that the return air ducts 46 and 47 communicate directly with the return air compartment 39 of the module 10, but at a position at near the outer end thereof.

In FIG. 7, which shows a narrow bus installation, again the supply air ducts 48 and 49 are near the transverse sides of the bus. But the return air ducts 51 and 52 are abutting each other at the center line of the bus. Again, the return air ducts 51 and 52 fluidly communicate with the return air compartment 39, but at the other end thereof.

Finally, in FIG. 8 there is shown a curved top bus wherein the supply air ducts 53 and 54 are again near the transverse sides of the bus, but the return air ducts 56 and 57 are in intermediate positions, relatively close to the center line but substantially spaced apart. Again, the return air ducts 56 and 57 fluidly communicate with the return air compartment 39, but at a position intermediate the two ends thereof It will thus be seen that the same identical module is so constructed and designed that it can accommodate any of these various installation requirements without modification of the module itself. That is, the conditioned air discharge opening 40 is sufficiently large and the transverse direction to accommodate the various supply air duct orientations, and, more importantly, the return air compartment 39 is relatively large in the transverse direction so as to accommodate each of the various types of return air duct configuration as shown.

Figure 9:
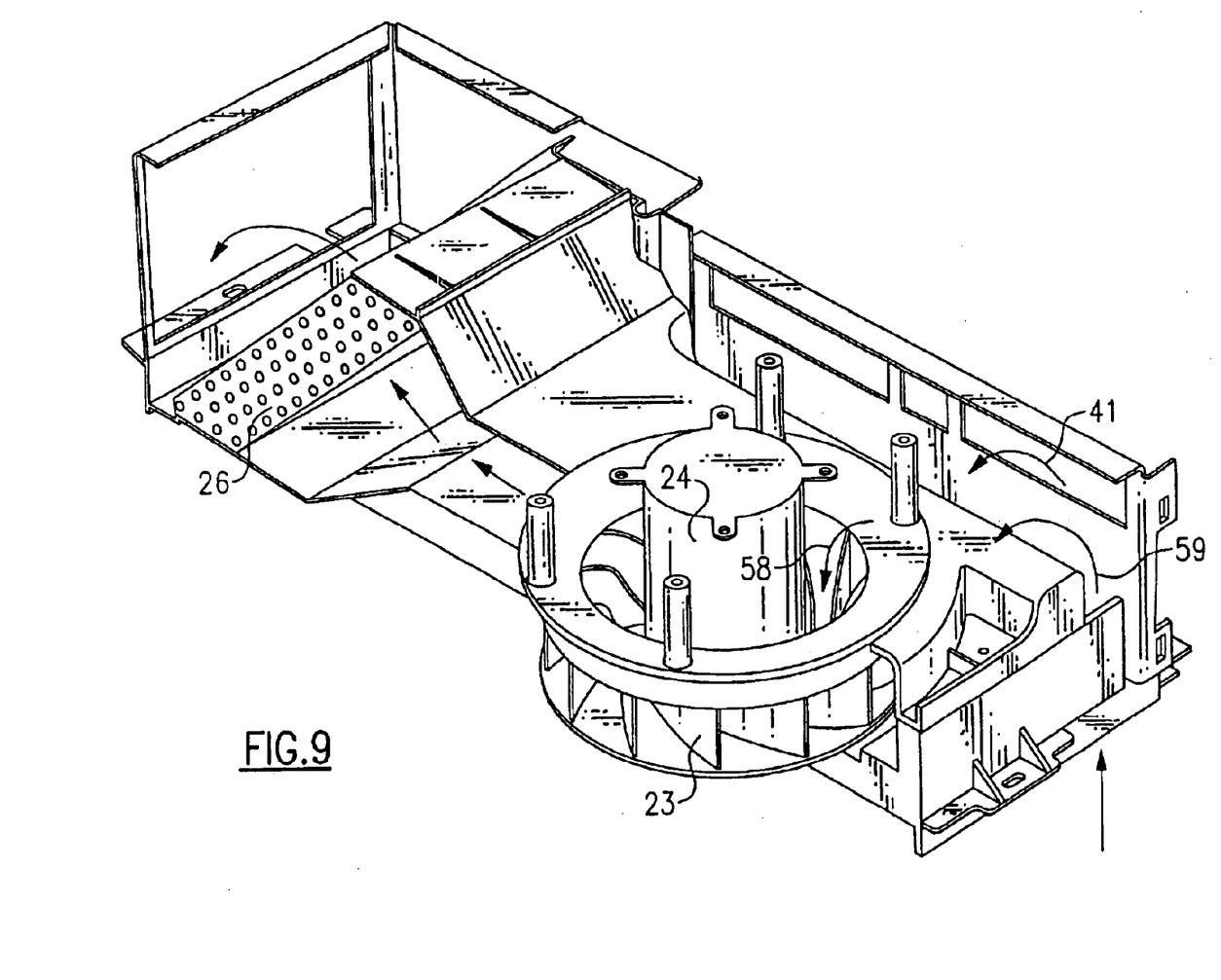
FIG. 9 is a perspective view of the evaporator section with its fan and mixer.
Figure 10:
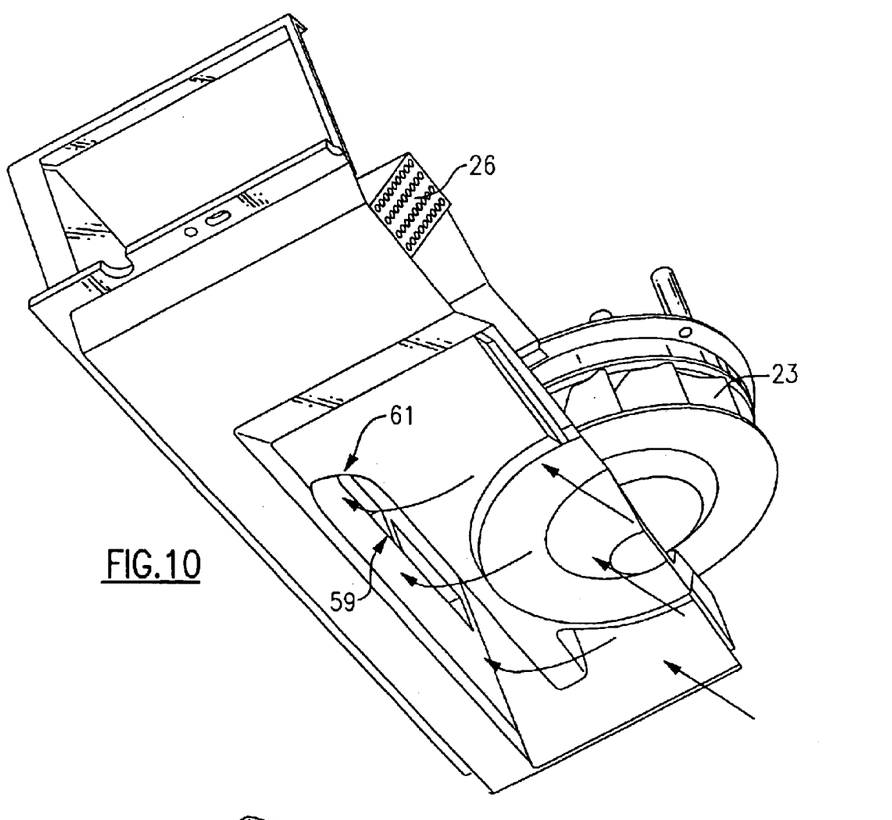
FIG. 10 is a bottom perspective view thereof.

In order to describe the evaporator section 17, and the manner in which the flow of return air is mixed with the flow of fresh air, reference is made to FIGS. 9–13. In FIG. 9, the evaporator blower 23 is shown with its blower inlet 58 receiving the air to be cooled, which flows downwardly and then outwardly toward and through the evaporator coil 26 as shown by the arrows. The cold air then flows further outwardly and downwardly to the supply air duct as shown by the arrow at the left. The air passing into the blower inlet 58 is a mixture of return air that flows upwardly through the channel 59 and the fresh air that flows in through the fresh intake window 41 as shown by the arrows. That is, referring to FIG. 10, the return air which has come into the return air compartment 39 below the evaporator blower 23 flows into an opening 61 and upwardly through the channel 59 as shown by the arrows. When the return air flow reaches the top of the channel 59 the amount of return air, and also the amount of fresh air passing through the fresh air intake window 41 will depend on the position of the fresh air flap 42.

Figure 11:
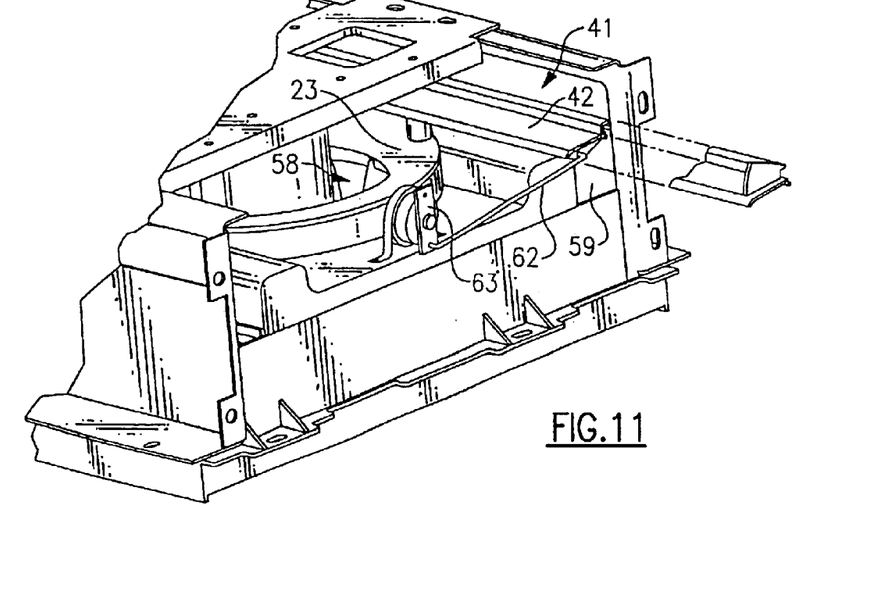
FIG. 11 is a perspective view of the evaporator section showing the fresh air flap in the fully opened position.

In FIG. 11, the fresh air flap 42 is shown as attached to a linkage 62, which in turn is attached to a rotatable lever 63 for selectively rotating the fresh air flap on its axis to thereby vary the size of the opening at the fresh air intake window 41. The position of the fresh air flap 42 is the fully opened position wherein there is no restriction of the flow of fresh air that is coming into the fresh air intake window 41. When in this position, the fresh air flap also closes off the exit side of the flow channel 59 in which the return air is flowing upwardly. Thus, when the fresh air flap 42 is in the fully opened position, none of the return air passes upwardly into the evaporator blower 23 and the only, and the only air passing into the evaporator blower 23 and on to the evaporator coil 26 is the fresh air coming in through the fresh air intake window 41. The return air in the channel 59 is thus caused to flow out into the atmosphere by way of an opening to be described hereinafter.

Figure 12:
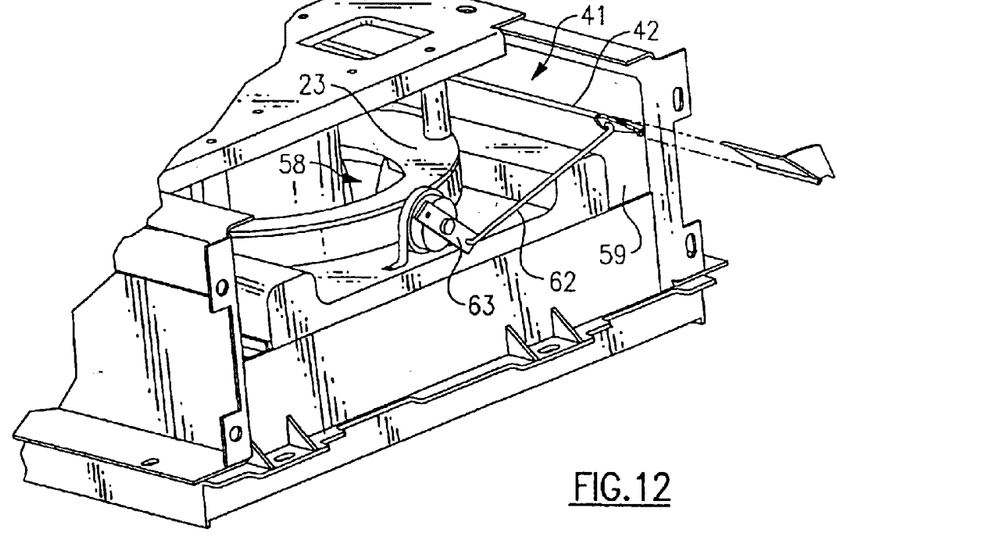
FIG. 12 is a perspective view thereof with the flap in an intermediate position.

In FIG. 12, the lever 63 and attached rod 62 are selectively moved to adjust the fresh air flow 32 to an intermediate position wherein the exit opening at the top of the channel 59 is uncovered, while at the same time the fresh air flap 42 tends to offer some restriction to the flow of fresh air coming into the fresh air intake window 41. The air being taken into the blower inlet 58 is thus a mixture of return air and fresh air, with only a portion of the return air being discharged to the outside.

Figure 13:
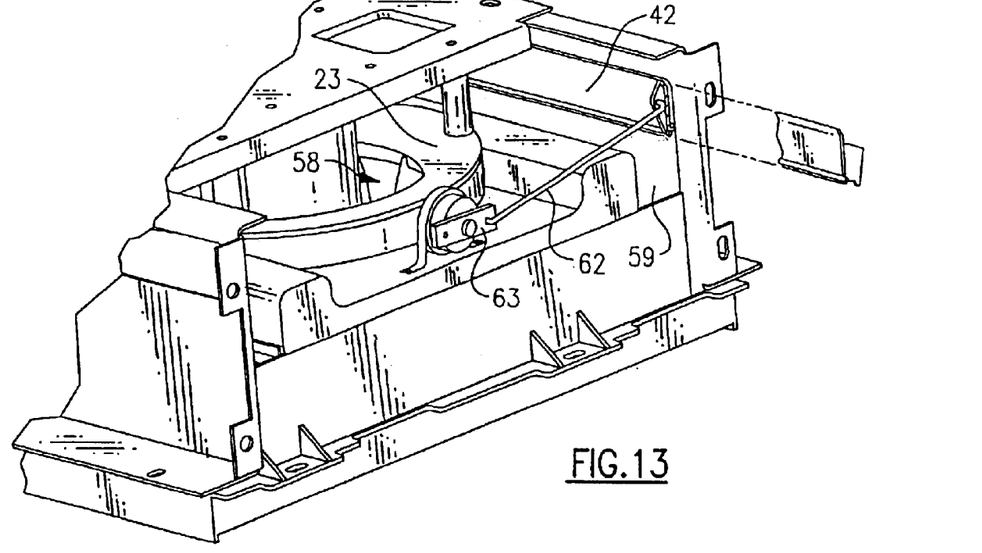
FIG. 13 is a perspective view thereof with the fresh air flap in the closed position.

FIG. 13 shows the fresh air flap in the closed position wherein it completely blocks off the fresh air intake window 41 and completely uncovers the channel 59. Thus, when in this position, all of the return air, and no fresh air, passes into the blower inlet 58, through the evaporator coil 26 and to the supply air ducts of the bus. It should, of course, be understood that the fresh air flap 42 maybe placed in any intermediate position not shown in order to obtain the desired mix as appropriate to meet the cooling needs as determined by the load in the passenger compartment of the bus, as well as the environmental conditions outside.

Of a structure of the evaporator section 17 as described hereinabove will be recognized as providing three levels within the evaporator section in which the flow of air occurs. At a lower level, the return air compartment 39 provides for a flow of return air from the return air duct to the evaporator section 17. At an intermediate level, there is a channel to guide the flow of return air upwardly, and in a parallel route, to provide the flow of mixed air downwardly through the evaporator blower 23. At a third, upper, level, there is a space provided for the flow of fresh air through the fresh air intake window 41, for the mixture of that fresh air with the return air blowing upwardly, and for the mixture to flow into the intake 58 of the blower 58.

Figure 14:
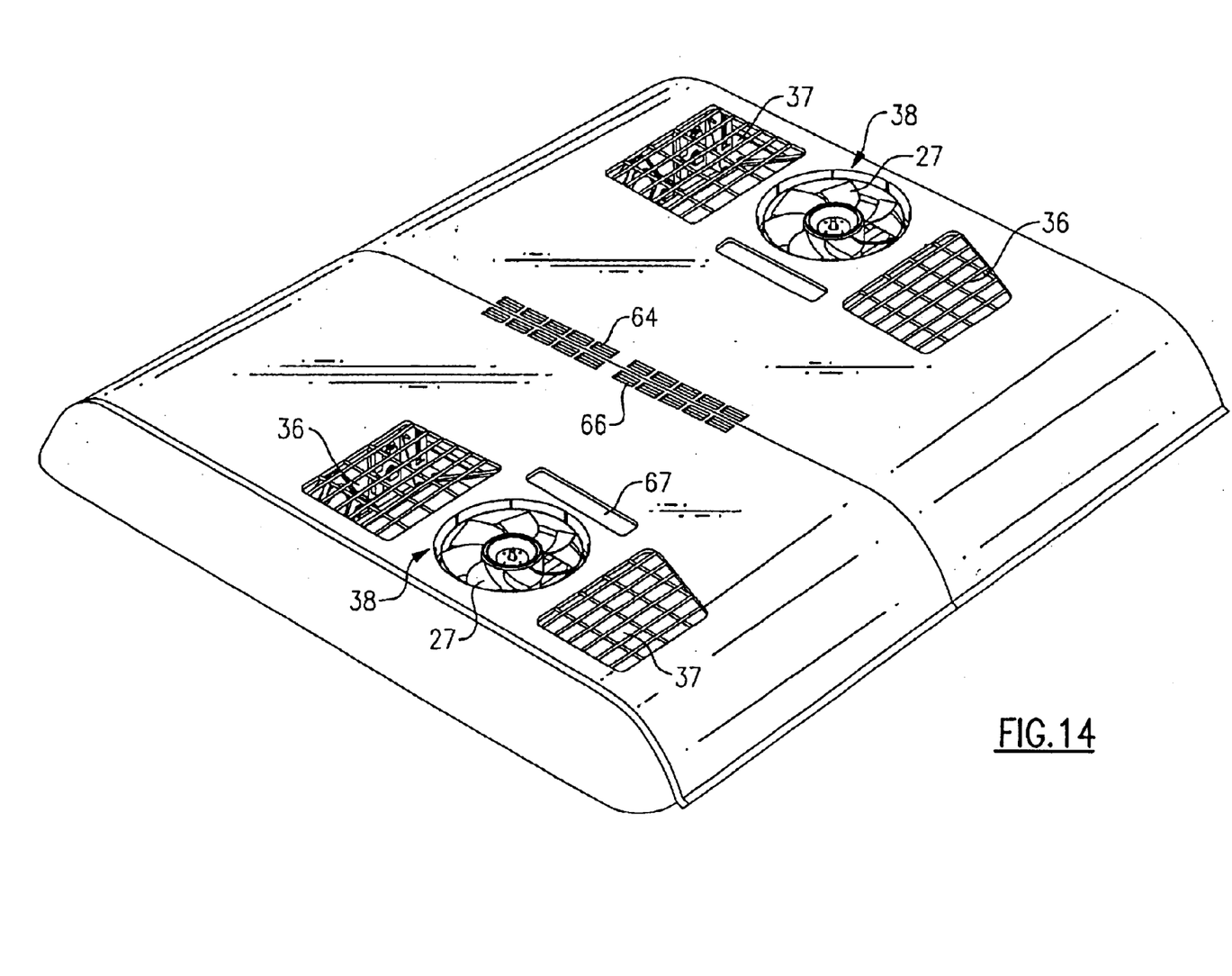
FIG. 14 is a perspective view of a pair of modules in adjacent relationship.

While a single unit is shown in its installed position on the bus in FIG. 1, the present module is designed to be "ganged" with one or more other modules to provide a collective air conditioning capacity as necessary to meet the needs of the bus. In FIG. 14, a pair of modules are stacked together, with one being turned, end to end, as shown. In this configuration, the two condensing sections are at the forward and rear ends of the combination, and the two evaporator sections are abutted up against one another. The grill openings are shown at 64 in one unit and at 66 in the other unit, to conduct the flow of fresh air to the evaporator section when the fresh air flap is opened, and for the outflow of returned air when the fresh air flap 42 is fully opened or partially opened. An opening 67 can be provided to augment the flow of fresh air to the evaporator.

Figures 15, 16:
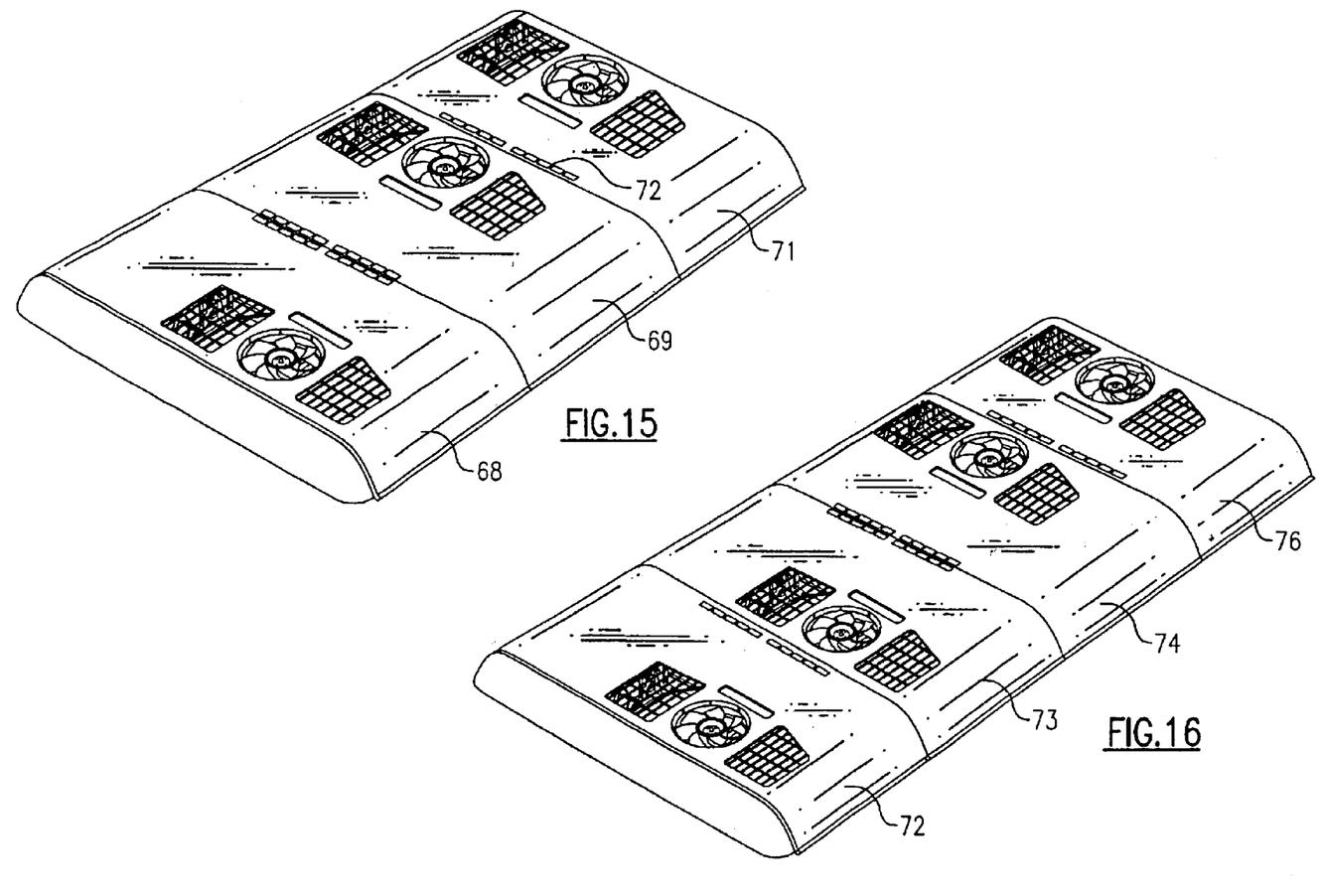
FIG. 15 is a perspective view of three modules in adjacent relationship.
FIG. 16 is a perspective view of four modules in adjacent relationship.

In FIG. 15, a pair of modules 68 and 69 are placed in ganged relationship in the manner as described hereinabove. A third module 71 is placed at the other end of module 69, so that it is parallel to the module 69, and not turned end for end as described hereinabove. Thus, the evaporator section of module 71 is adjacent the condenser section of module 69, and in particular, the grill opening 72 are disposed adjacent to the condenser fan of module 69.

In FIG. 16, there are shown four modules 72, 73, 74 and 76, with modules 72 and 73 being parallel with each other and with modules 74 and 76 being parallel with respect to each other but being rotated end for end with respect to the modules 72 and 73.

It should be recognized that the individual modules can be ganged in any combination in order to meet the required capacity for the bus, while also being positioned so that the return air openings in the bus are registerable with the respective inlet and outlet openings in the evaporator sections. While not shown, it should be understood that the modules can also be installed in positions so that they are longitudinally spaced and not necessarily abutted up against each other as shown.

Figure 17:
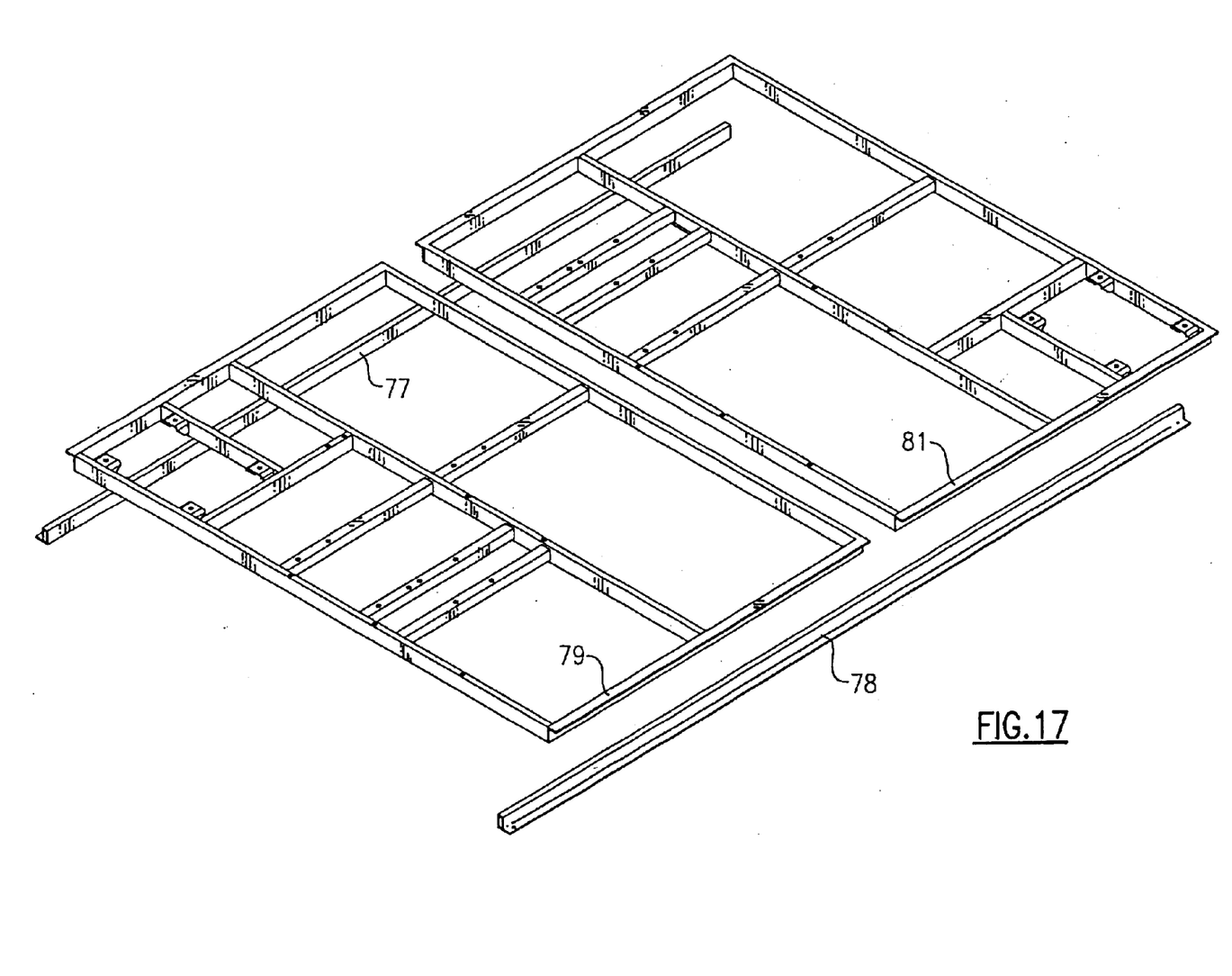
FIG. 17 is a perspective view of the modules frames and related mounting rails.

In order to mount the modules, either as a single unit or in combinations as shown, it is desirable to have a method and apparatus for easily attaching the modules to the rooftop of the bus. A preferred approach is to have a pair of transversely spaced, longitudinally extending rails 77 and 78 which are attached to a bus by appropriate fasteners or the like. The framework of the individual modules can then, in turn, be attached to the rails 77 and 78 by appropriate fasteners such as screws or the like. In FIG. 17, a pair of module frames 79 and 81 are shown, with the frame 81 being turned end for end in a manner as described hereinabove. This arrangement allows for the modules to be easily attached to the rails such that they are all centered with respect to the center line of the bus, and can be attached to the rails 77 and 78 at any longitudinal position that is desired.

While this invention has been described with reference to a particular structure disclosed herein, it should be understood that it is not confined to the details set forth in this application, but is rather intended to cover any modifications and changes may come within the scope of the following claims.

We claim:

1. A bus rooftop air conditioner system having a plurality of identical modules with each module comprising:
    a frame;
    a condenser section mounted to said frame and having a pair of condenser coils with a single fan disposed therebetween for simultaneously drawing outside air through both of said condenser coils and discharging it to the outside;
    an evaporator section mounted to said frame and having at least one fan for circulating return air from a passenger compartment of a bus, through an evaporator coil to a supply air duct and to the passenger compartment; and
    means for securing said frame to the bus top, said securing means comprising a pair of rails attached to the bus rooftop and to which said frame is attached so as to straddle a longitudinal center line of the bus.

2. A bus rooftop air conditioner as set forth in claim 1 and including a refrigeration circuit that includes one of said condensing coils and one of said evaporator coils, a compressor and an expansion valve.

3. A bus rooftop air conditioner as set forth in claim 2 and including an inverter electrically connected to said compressor and to drive motors for said condenser and evaporator fans.

4. A bus rooftop air conditioning system as set forth in claim 1 wherein a pair of modules are mounted in tandem on the bus top with each extending transversely across the width of the bus.

5. A bus rooftop air conditioner system as set forth in claim 4 wherein said modules are in parallel, side by side relationship.

6. A bus rooftop air conditioner system as set forth in claim 4 wherein said modules are mounted in inverse relationship with one being rotated end for end with respect to the other.

7. A method of providing air conditioning to a bus having at least one rooftop opening for conducting the flow of return air from a passenger compartment and at least one rooftop opening for conducting the flow of conditioned air to the passenger compartment, comprising the steps of:
    providing a plurality of relatively small, compact air conditioning modules;
    determining the total amount of air conditioning capacity required for the bus;
    determining the number of modules needed to collectively meet that total capacity requirement;
    installing said number of modules on the bus in a desired arrangement such that each module registers with both a return air opening and a supply air opening in the rooftop and with each module being a self contained air conditioning system which, when connected to electric power is capable of providing conditioned air to the bus;
    wherein said modules are installed in tandem, with one being disposed longitudinally forward of the other and in inverse side-by-side relationship therewith, with one being rotated end for end with respect to the other module.

8. A method as set forth in claim 7 wherein said modules are installed in such a way that each one extends substantially transversely across the width of the bus.

9. A method as set forth in claim 7 wherein said module are in parallel relationship.

* * * * *